United States Patent [19]
Nishikawa

[11] Patent Number: 5,406,532
[45] Date of Patent: Apr. 11, 1995

[54] OPTICAL SYSTEM FOR A MAGNETO-OPTICAL RECORDING/REPRODUCING APPARATUS

[75] Inventor: Koichiro Nishikawa, Tokyo, Japan

[73] Assignee: Asahi Kogaku Kogyo Kabushiki Kaisha, Tokyo, Japan

[21] Appl. No.: 150,799

[22] Filed: Nov. 12, 1993

Related U.S. Application Data

[63] Continuation of Ser. No. 782,727, Oct. 28, 1991, abandoned, which is a continuation of Ser. No. 614,674, Nov. 19, 1990, abandoned, which is a continuation of Ser. No. 163,899, Mar. 4, 1988, abandoned.

[51] Int. Cl.⁶ .................. G11B 13/04; G11B 11/12
[52] U.S. Cl. .................. 369/13; 369/110; 369/112; 250/201.5
[58] Field of Search .............. 369/13, 110, 112, 44.13, 369/44.23, 44.37; 359/196, 197, 489, 581, 583; 250/201.5, 202

[56] References Cited

U.S. PATENT DOCUMENTS

| | | | |
|---|---|---|---|
| 4,689,781 | 8/1987 | Ando | 369/46 |
| 4,737,946 | 4/1988 | Yamashita et al. | 369/46 |
| 4,797,868 | 1/1989 | Ando | 250/201 |
| 4,817,074 | 3/1989 | Yamanaka | 369/46 |
| 4,868,377 | 9/1989 | Nishikawa | 250/201 |
| 4,954,702 | 9/1990 | Kurogama | 250/201.2 |
| 4,984,225 | 1/1991 | Ando | 369/13 |

FOREIGN PATENT DOCUMENTS 61-208641 9/1986 Japan .

*Primary Examiner*—Hoa T. Nguyen
*Attorney, Agent, or Firm*—Sandler Greenblum 054061643

[57] ABSTRACT

A system for a magneto-optical information recording/reproducing system has a polarizing beam splitter for splitting a light beam reflected by a magneto-optical disk, which utilizes the Kerr effect, into one light beam for detecting focussing errors and two light beams for detecting tracking errors. The polarizing beam splitter operates to split a polarizing light beam in such a manner that the two light beams for detecting tracking errors have a polarizing beam composition that is perpendicular to the polarizing beam composition of the light beam for detecting focussing errors. The optical system includes a light receiving element for receiving the light beam split by the beam splitter. The light receiving element has a light receiving portion for detecting focussing errors and a light receiving element for detecting tracking errors. The light receiving portion for detecting focussing errors has a plurality of light receiving areas for receiving the light beam for detecting focussing errors. The light receiving portion for detecting tracking errors is provided with a pair of light receiving areas for receiving the two light beams for detecting tracking errors, the pair of light receiving areas being positioned to sandwich the light receiving portion for detecting focussing errors.

16 Claims, 7 Drawing Sheets

FIG. 3
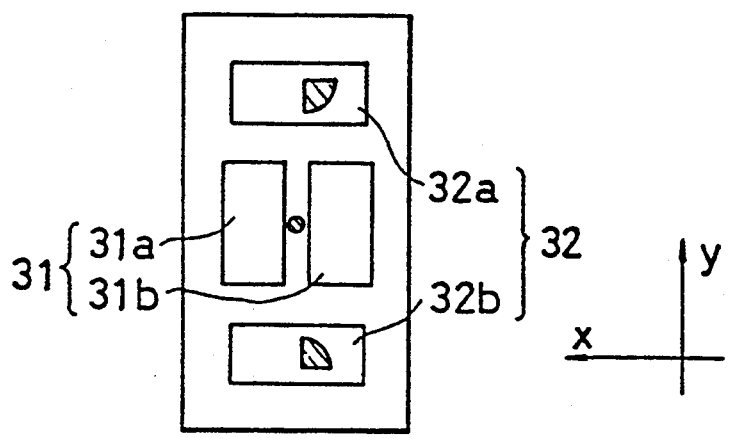
FIG. 4
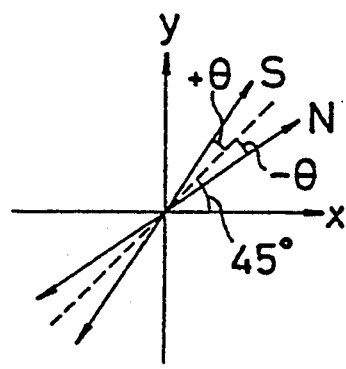
FIG.5(A)  FIG.5(B)  FIG.5(C)
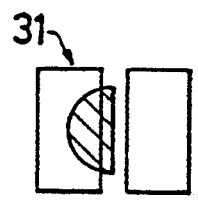 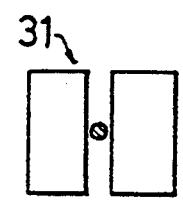 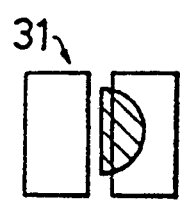
31a  31b     31a  31b     31a  31b
TOO NEAR    BE IN WELL FOCUS (DISTANCE IS RIGHT)    TOO FAR

TOO NEAR | BE IN WELL FOCUS (DISTANCE IS RIGHT) | TOO FAR

OPTICAL SYSTEM FOR A MAGNETO-OPTICAL RECORDING/REPRODUCING APPARATUS

This application is a continuation of application Ser. No. 07/782,727, filed Oct. 28, 1991, now abandoned, which is a continuation of application Ser. No. 07/614,674, filed Nov. 19, 1990, now abandoned, which is a continuation of application Ser. No. 07/163,899, filed Mar. 4, 1988, now abandoned.

BACKGROUND OF THE INVENTION

1. Field of the Invention

This invention relates to an optical system of an information recording/reproducing apparatus for a magneto-optic disk, in which part of an area on a recording body is heated by a laser beam in order to weaken an anti-magnetic force, and in that state, an outside magnetic field is applied to invert the magnetization of that particular area so that information can be magnetically recorded, information being photoelectrically read and rewritten using the magnetic Kerr effect.

2. Description of the Prior Art

One kind of optical system of an information recording/reproducing apparatus for a magneto-optic disk is shown in FIG. 12.

Optical system A includes a laser beam emitting element 1, such as of a semiconductor for emitting a linearly polarized laser beam, a collimate lens 2 for collimating the beam, a beam forming prism 3 for correcting a sectional configuration of the beam, a half mirror prism 4, and an objective lens 5 for forming a spot on a magneto-optic disk D and taking out a reflecting beam reflected by the magneto-optical disk D. The optical system A includes a half-wave plate 6 for turning the azimuth of the linearly polarized light of the reflection beam guided through the objective lens 5 and the half mirror prism 4, and a polarizing beam splitter 9 for splitting the beam coming from the half-wave plate 6 and radiating to a light receiving element 7 for detecting tracking errors, and a light receiving element 8 for detecting focussing errors, respectively. Furthermore, the optical system A includes condenser lenses 10 and 10', which are disposed to the optical paths split by the polarizing beam splitter 9, and a cylindrical lens 11 disposed between the condenser lens 10 and the light receiving element 8 for detecting focussing errors.

The light receiving element 7 for detecting tracking errors performs a tracking error detection according to a so-called push-pull method, by finding a difference in the output between two adjacent light receiving areas. On the other hand, the light receiving element 8 for detecting focussing errors has four light receiving areas; these light receiving areas being arranged in the form of a matrix or grill pattern, i.e., the light receiving areas are arranged in two rows and two columns. The light receiving element 8 for detecting focussing errors performs a focussing error detection according to a so-called astigmatism method, by finding differences in the sums of the output of opposite angles of the four light receiving areas.

The reproduction of information recorded on the magneto-optic disk D utilizes a phenomenon in which when a light beam is reflected by the magneto-optic disk D, the polarizing direction (i.e., the direction of the vibrating surface of an electric field vector is very slightly turned, due to the magnetic Kerr effect.

That is, in the optical system A, a turn of the vibrating surface is converted into a difference in the intensity of light radiated to the respective light receiving elements 7 and 8 by utilizing the half-wave plate 6 and the polarizing beam splitter 9.

If the sum of the output of the two light receiving areas of the light receiving element 7 for detecting tracking errors is referred to as the "first output sum" and if the sum of the outputs of the four light receiving areas of the light receiving element 8 for detecting focussing errors is referred to as the "second output sum", a direct current portion, such as the output variation of the laser beam emitting element of a semiconductor, is offset by calculating the difference between the first output sum and the second output sum and only a signal portion caused by the turn of the beam in the polarizing direction is taken as a reproduction signal.

However, in such an optical system A of an information recording/reproducing apparatus for a magneto-optic disk, since the light receiving element 7 for detecting tracking errors and the light receiving element 8 for detecting focussing errors must be independently provided, the number of component parts becomes large and the optical system becomes bulky. Moreover, much time and labor are required for adjusting the system.

SUMMARY OF THE INVENTION

The object of the present invention is to provide an optical system of an information recording/reproducing apparatus for a magneto-optic disk, in which the optical system has a small number of component parts making the system compact, and yet, the receiving elements can be easily adjusted.

In order to achieve the above-mentioned object, an optical system according to the present invention includes an objective lens for converging and radiating a laser beam emitted from a laser beam source and taking out a reflecting beam reflected by the magneto-optic disk. The optical system further includes a polarizing beam splitting means for splitting the reflecting beam into one beam of light for detecting focussing errors and two beams of light for detecting tracking errors., The polarizing beam splitting means functions to split a polarizing beam in such a manner that two of the three splitting beams of light become linearly polarized beams of light which are perpendicular to each other, the two splitting beams of light for detecting tracking errors having only one of the two linearly polarizing beams of light perpendicular to each other. The optical system further includes a light receiving element. This light receiving element has a light receiving portion for detecting focussing errors and a light receiving portion for detecting tracking errors. The light receiving portion for detecting focussing errors is provided with a plurality of light receiving areas for receiving the beam of light for detecting focussing errors. The other light receiving portion for detecting tracking errors is provided with a pair of light receiving areas for receiving the two beams of light for detecting tracking errors, the pair of light receiving areas being positioned for sandwiching the light receiving portion for detecting focussing errors.

Since the present invention has the above-mentioned construction, the beam reflected by the magneto-optic disk is split into one beam of light for detecting focussing errors and two beams of light for detecting tracking errors by the polarizing beam splitting means. At that time, two of the three split light beams are made into linearly polarized beams of light that are vertical with each other by the polarizing beam splitting means, and the two beams of light for detecting tracking errors include one of the two linearly polarizing beams of light perpendicular to each other. The two beams of light for detecting tracking errors out of the three split beams of light are converged to the respective light receiving areas of the light receiving portion for detecting tracking errors. The two beams of light for detecting tracking errors are utilized for detecting tracking error signals. On the other hand, one beam of light for detecting focussing errors is directly converged towards the light receiving portion for detecting focussing errors. Moreover, these beams are utilized for reproducing signal.

BRIEF DESCRIPTION OF THE DRAWINGS

FIG. 3 is a plan view of a light receiving element used in the optical system shown in FIG. 1;

FIG. 4 an illustration showing a turn of the polarizing direction of a reflecting beam of the magneto-optic disk shown in FIG. 1;

FIGS. 5A-5C are schematic views showing a light receiving state of a light receiving portion for detecting focussing errors of the light receiving element shown in FIG. 3;

DETAILED DESCRIPTION OF THE PREFERRED EMBODIMENTS

Figure 1:
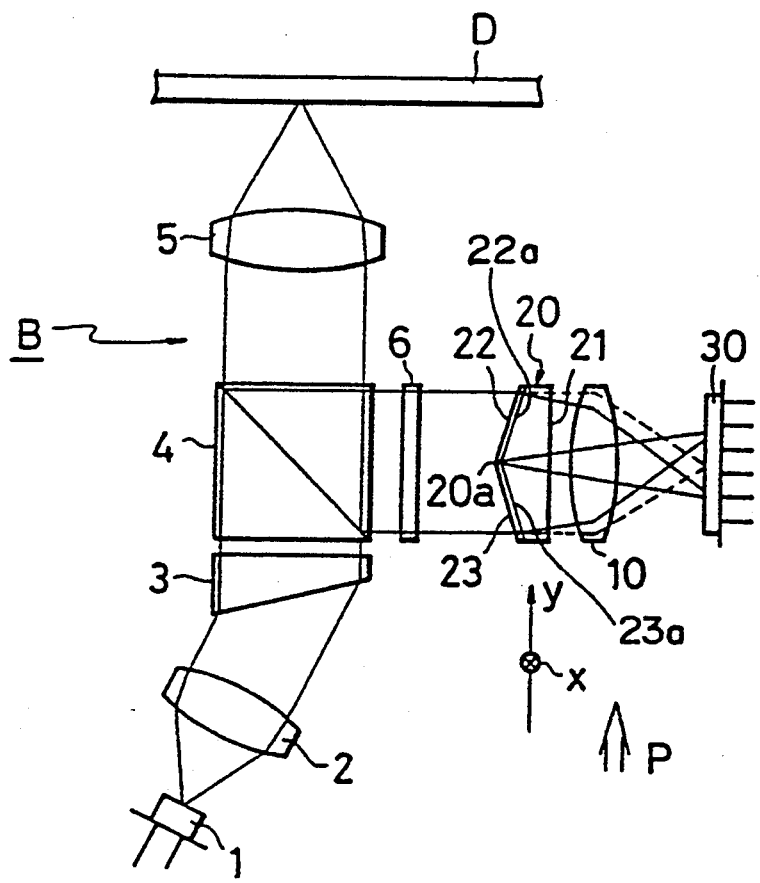
FIG. 1 is an illustration for explaining one embodiment of an optical system of an information recording-/reproducing apparatus for a magneto-optic disk according to the present invention.

The present invention will be described with reference to the accompanying drawings. FIGS. 1 through 5 illustrate one embodiment of the present invention.

As is shown in the figures, optical system B includes a laser beam emitting element 1 of a semiconductor, a collimate lens 2, a beam forming prism 3, a half mirror prism 4, an objective lens 5, a half-wave plate 6, and a condenser lens 10. Located between half-wave plate 6 and the condenser lens 10 is a wedge-shaped prism 20 that functions as a polarizing beam splitting means. In a converging position of a reflecting beam when the objective lens 5 is well focussed so as to form a beam spot on the magneto-optic disk D, there is provided a light receiving element 30, which will be described afterward.

Figure 2:
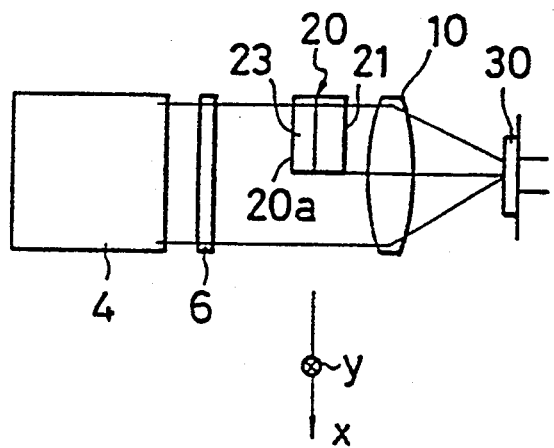
FIG. 2 is an illustration showing a portion of FIG. 1 when viewed from a direction as shown by arrow P in FIG. 1.

The wedge-shaped prism 20, as shown in FIG. 2, is disposed in such a manner as to block about half of the reflecting beam. The wedge-shaped prism 20 has a ridge line 20a disposed within the reflecting beam. The ridge line 20a conforms with generally a half portion of the diameter of the reflecting beam in a direction corresponding to its track width direction.

The wedge-shaped prism 20 includes a beam outgoing face 21 located at the condenser lens 10 side, and two incident faces 22 and 23 located at the half-wave plate 6 side. The beam outgoing face 21 is disposed perpendicular to the optical axis of a reflecting beam, whereas the incident faces 22 and 23 are located at both sides of the ridge line 20a and have a predetermined angle with the beam outgoing face 21. The wedge-shaped prism 20 functions as a knife edge with respect to a beam which is not made incident therein. On the other hand, the wedge-shaped prism 20 functions to split the light beam, which has been made incident to the wedge-shaped prism 20, into two beams of light for detecting tracking errors so that a polarity of the tracking error can be obtained.

Moreover, if a ray of light that is made incident to the incident face 22 is referred to as a "first incident ray", and if a vertical line of the incident face 22 at the incident point of the ray of light is referred to as a "first normal at the point of incidence", and if a surface including the first incident ray and the first normal at the point of incidence is referred to as a "first plane of incidence or first incident plane", the incident face 22 of the wedge-shaped prism 20 is coated with a polarizing beam splitting material for allowing only a composition (S composition) perpendicular to the first plane of incidence or first incident plane. Likewise, if a ray of light that is made incident to the incident face 23 is referred to as a "second incident ray", and if a vertical line of the incident face 23 at the incident point of the ray of light is referred to as a "second normal at the point of incidence", and is a surface including the second incident ray and the second normal at the point of incidence is referred to as a "second plane of incidence or second incident plane", the incident face 23 is coated with a polarizing beam splitting material for allowing only a composition (P composition) parallel to the second plane of incidence or second incident plane.

The afore-mentioned light receiving element 30, shown in FIG. 3, includes a light receiving portion 31 for detecting focussing errors and a light receiving portion 32 for detecting tracking errors. The light receiving portion 31 for detecting focussing errors has two light receiving areas 31a and 31b disposed in a laterally adjacent relation in the figure. On the other hand, the light receiving portion 32 for detecting tracking errors has two light receiving areas 32a and 32b disposed on both sides in the vertical direction in the figure in such a manner as to sandwich the light receiving portion 31 for detecting focussing errors therebetween. Moreover, these two light receiving areas 31a and 31b are vertically extended in parallel relation in the figure, whereas the light receiving areas 32a and 32b are extended laterally in the figure, i.e., in a direction perpendicular to the light receiving areas 31a and 31b.

The magneto-optic disk D comprises a base plate formed with a magnetic film. The magneto-optic disk D is provided with a spiral guide groove along a track (magnetized in one direction when no information is recorded) for recording information.

Figure 1A:
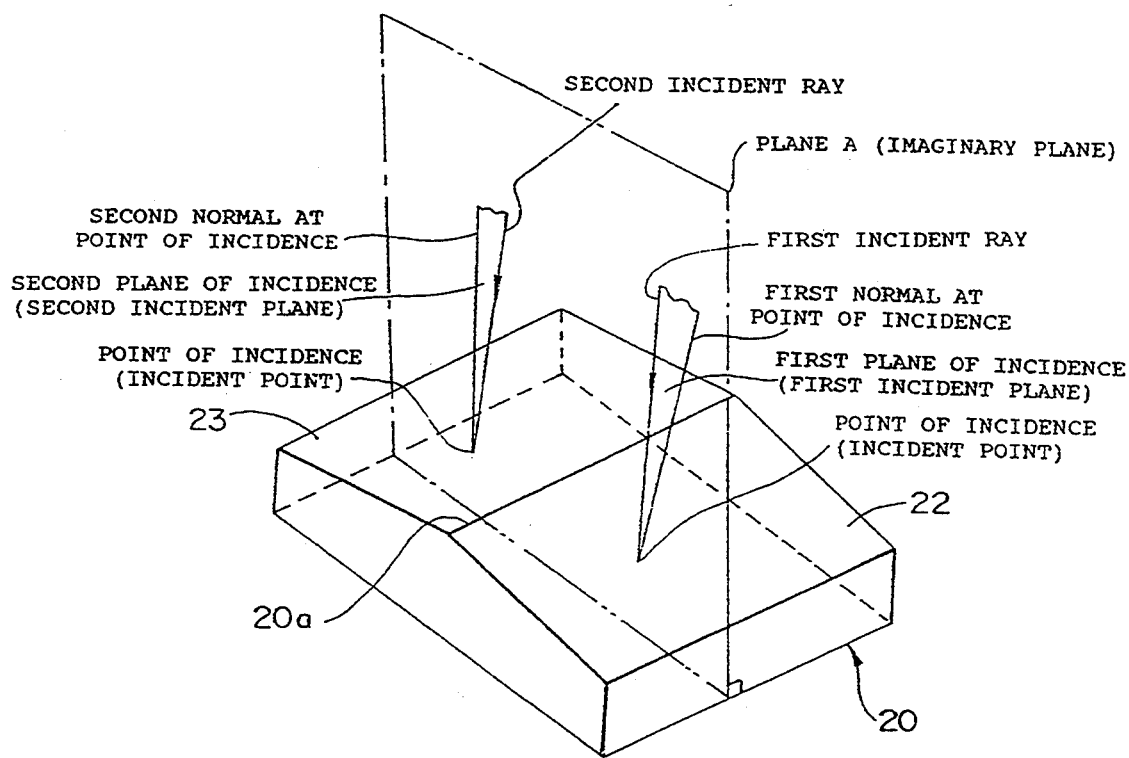
FIG. 1a is a perspective view of a wedge prism used in FIG. 1, with the different rays and planes clearly illustrated.

FIG. 1a better illustrates the prism wedge 20 of FIG. 1. Additionally, this figure more clearly illustrates the first incident ray, the first normal at the point of incidence of the ray with respect to surface 22, and the first plane of incidence which includes the first incident ray and the first normal at the point of incidence. It also clarifies that the S composition is perpendicular to the first plane of incidence, which plane includes the first incidence ray and the first normal. Similarly, the second incidence ray, the second normal at the point of incidence, both of which are taken with respect to surface 23, and the second plane of incidence, are better illustrated along imaginary plane A. Additionally, this drawing facilitates an understanding of the composition P which is parallel to the second plane of incidence.

Figure 6:
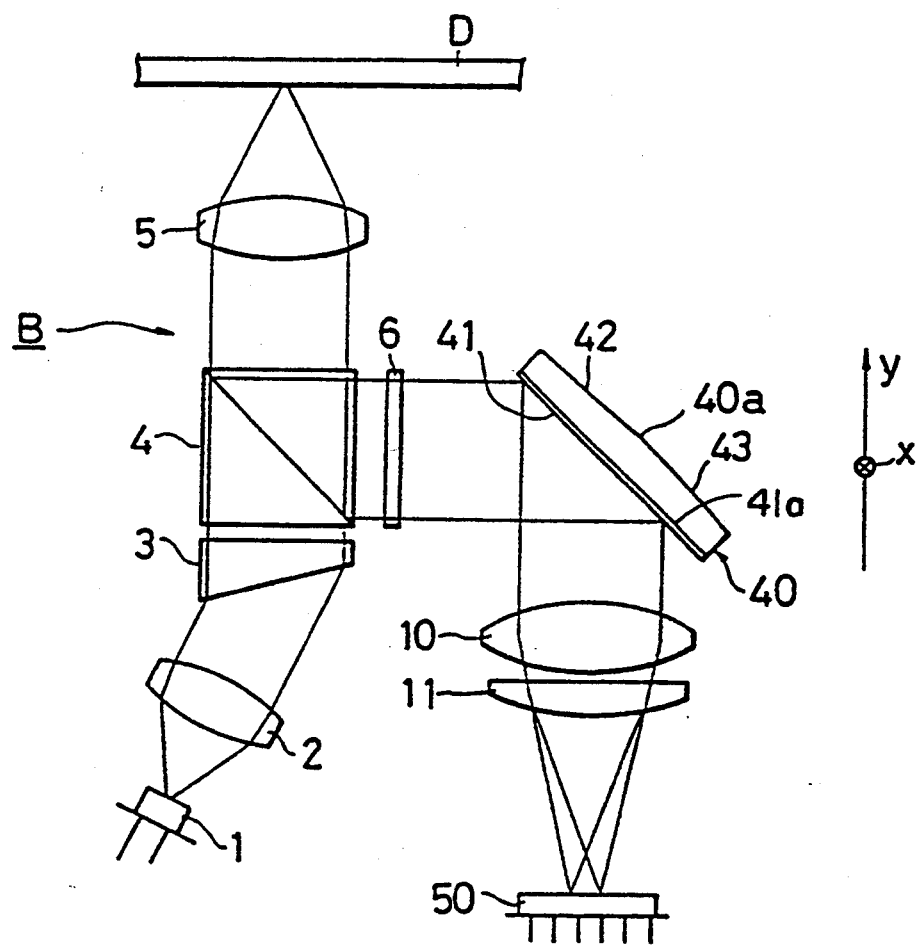
FIG. 6 is a schematic view showing a second embodiment of an optical system of an information recording-/reproducing system for a magneto-optic disk according to the present invention together with an optical path of a surface reflecting composition by a first reflecting surface of a wedge-shaped prism.
Figure 6A:
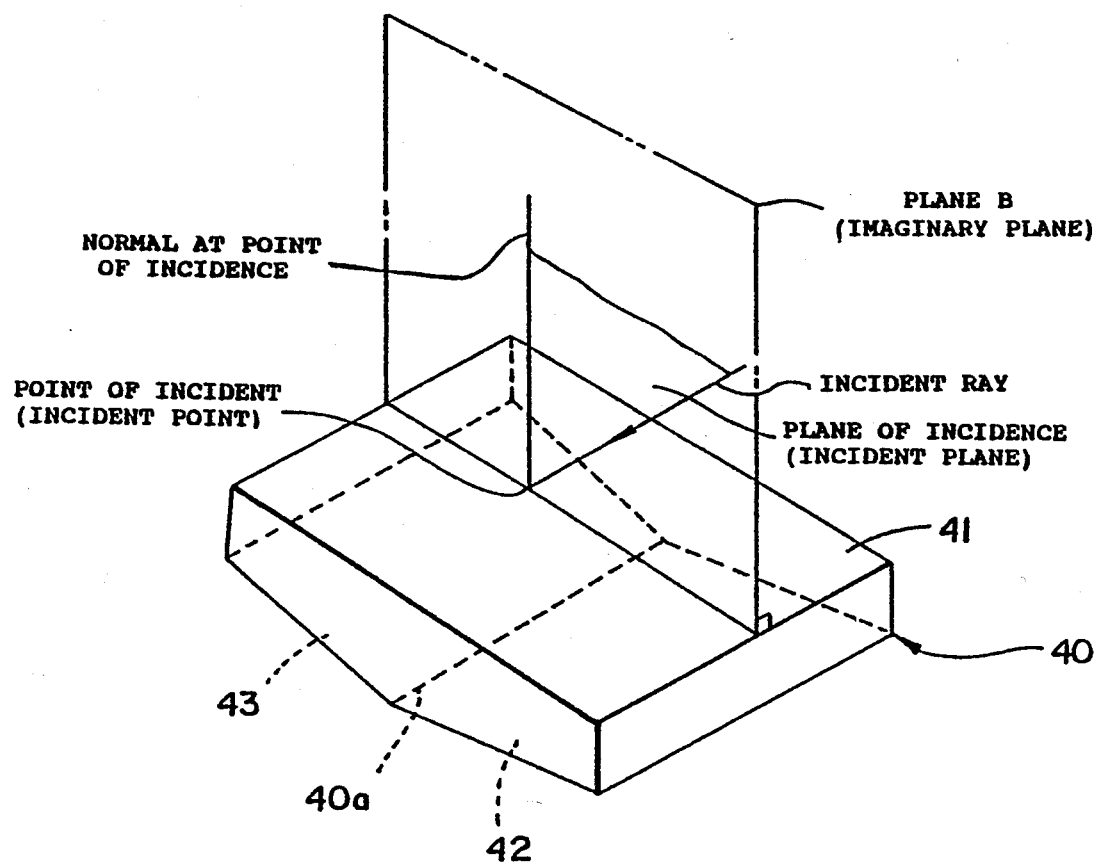
FIG. 6a is a perspective view of the wedge prism, of FIG. 6, illustrating various rays and planes.

FIG. 6a clearly illustrates the wedge-shaped prism 40, which includes a first reflecting surface 41 which forms about a 45° angle with the optical axis of the beam from plate 6. Illustrated in FIG. 6a are the incidence plane referred to hereinafter, together with the normal at the point of incidence, the point of incidence, and the imaginary plane B within which the normal and the incident ray lie. In this case, the normal at the point of incidence is perpendicular to the substantially planar surface 41 and the incident ray is taken along the plane, and is perpendicular to the normal at the point of incidence.

In the optical system B described above, the beam of a linearly polarized beam emitted by the laser beam emitting element 1 of a semiconductor is collimated by the collimate lens 2, and is corrected to a circular shape by the beam forming prism 3. The beam that is passed through the half mirror prism 4 forms a very tiny spot on the magneto-optic disk D by the objective lens 5 and is thereafter reflected by the magneto-optic disk D. This reflecting beam is made incident to the half mirror prism 4 through the objective lens 5.

Furthermore, the reflecting beam is reflected by the half mirror prism 4 toward the half-wave plate 6, and is thereafter passed through the half-wave plate 6. The beam passed through the half-wave plate 6, as shown in FIG. 2, is allowed about a half portion thereof to be made incident to the condenser lens 10 through the wedge-shaped prism 20, whereas the remaining half portion is directly made incident to the condenser lens 10. The beam of light passed through the wedge-shaped prism 20 and the beam of light not passed therethrough are converged toward the light receiving element 30 by the condenser lens 10.

Objective lens 5 is actuated by an actuator (not shown) according to an error signal, as will be described below in order to correct forcussing errors and tracking errors due to surface swing or eccentricity of the magneto-optic disk D.

Next, the function of an information recording/reproducing apparatus for a magneto-optic disk provided with the optical system B will be described. For easy understanding, the description will be divided into two categories, i.e, a first category wherein information is recorded and a second category wherein information is reproduced.

In order to record information in the magneto-optic disk D, the semiconductor laser beam emitting element 1 is oscillated according to an information signal, and the laser beam having a high output power is converged into a very tiny spot in the manner as previously described and is then radiated to the magneto-optic disk D. At that time, the laser beam raises the temperature of the magneto-optic disk to so as weaken the anti-magnetic force of the magneto-optic disk D at the point where the temperature has been raised. On the other hand, in that state, the magneto-optic disk D is incurred with a weak magnetic field by a magnet (not shown) from outside to reverse the magnetization of the temperature-raised portion.

In this way, the portion of the magneto-optic disk D where the laser beam has been radiated and the remaining portion thereof where the laser beam has not been radiated have different magnetic directions, resulting in information being recorded depending on the direction of the magnetization.

On the other hand, when such recorded information is to be reproduced, a turn of polarizing direction due to a magnetic Kerr effect occurs.

More specifically, in the optical system B, when the linearly polarized laser beam emitted by the semiconductor laser beam emitting element 1 is radiated in its form of a very tiny spot as mentioned, to the magneto-optic disk D, the polarizing direction of the reflecting beam reflected by the magneto-optic disk D is turned by $+\theta$ or by $-\theta$ depending on the direction of magnetization in the position where the spot has been formed. Moreover, the reflecting beam which has been turned in its polarizing direction is reflected by the half mirror prism 4 and is then further turned by 45° by the half-wave plate 6.

For the purpose of explanation, the direction vertical to the paper surface of FIG. 1 is referred to as an "x-axis" and the direction vertical both to the x-axis and the optical axis of the beam reflected by the half mirror prism 4 is referred to as a "y-axis". When the outgoing beam of the half-wave plate 6 is viewed from a position faced to the beam outgoing face of the half-wave plate 6, the polarizing direction of the reflecting beam reflected by the magneto-optic disk D becomes something like that of FIG. 4. That is, the polarizing direction of the reflecting beam coming from the magneto-optic disk D is varied, as shown by N and S in FIG. 4, depending on the direction of magnetization of the track of the magneto-optic disk D at its portion where the spot has been formed. Shown by the broken line in the figure is a reference azimuth when the direction is not affected by the magnetic Kerr effect. The reference azimuth forms 45° with the x-axis.

About a half portion of the reflecting beam which has been turned in its polarizing direction in the manner described is then made incident to the wedge-shaped prism 20. And, the beam made incident to the wedge-shaped prism 20 is split into linearly polarized beams of light perpendicular to each other due to the function of the afore-mentioned polarizing beam splitting material coated on incident faces 22 and 23 of the wedge-shaped prism 20. That is, the beam which has been made incident to the wedge-shaped prism 20 is made incident to incident face 22, 23, and the portion of the beam made incident to incident face 22 comes to have only a composition of the x-axis direction, whereas the remaining portion of the beam made incident to the incident face 23 comes to have only a composition of the y-axis direction.

Therefore, if the intensity of the beam made incident to incident face 22 and radiated to one light receiving area 32b of the light receiving portion 32 for detecting tracking errors is referred to as a "first intensity of the beam", and the intensity of the beam made incident to the other incident face 23 and radiated to the other light receiving area 32a for detecting tracking errors is referred to as a "second intensity of the beam", the ratio between the first intensity of the beam and the second intensity of the beam can be represented by the formula set forth below when the spot correctly traces the the track.

$$\sin^2(45\pm\theta): \cos^2(45\pm\theta)$$

Therefore, by finding a difference in the output between the two light receiving areas 32a and 32b, a plus and/or a minus signal that is proportional to approximately $2\theta$ (i.e., a reproducing signal) can be obtained.

Next, there will be described a way for detecting focussing errors and tracking errors when information is recorded or reproduced.

The portion of the outgoing beam from the half-wave plate 6 which has not be blocked by the wedge-shaped prism 20 is converged toward the center of the light receiving element 30, as shown by the broken line of FIG. 1, and is made incident to the light receiving portion 31 for detecting focussing errors disposed to the center of the light receiving element 30. At that time, the light receiving state of the light receiving portion 31 for detecting focussing errors (i.e., the beam radiating state to the light receiving portion 31 for detecting focussing errors) is varied, as shown in FIGS. 5(A), 5(B) and 5(C), depending on the distance between the objective lens 5 and the magneto-optic disk D. That is, when the distance is too near, the beam is radiated to one light receiving area 31a, as shown in FIG. 5(A), and when the distance is too far, the beam is radiated to the other light receiving area 31b, as shown in FIG. 5(C). When the distance is right, the beam is converged between these light receiving areas and not radiated to any of the light receiving areas, as shown in FIG. 5(B).

Therefore, by finding the difference in output between the light receiving areas 31a and 31b, the focussing error signal can be detected according to a knife edge test.

The detection of tracking error signals, as will be described hereinafter, is performed by deducting the output of the respective light receiving areas 32a and 32b of the light receiving portion 32 for detecting tracking errors.

The beam blocked by the wedge-shaped prism 20 is split into two beams of light for detecting tracking errors by the wedge-shaped prism 20, as previously described. The two split light receiving portions for detecting tracking errors are converged to the respective light receiving areas 32a and 32b of the light receiving portion 32 for detecting tracking errors.

At that time, the intensity of the beams radiated to the respective areas 32a and 32b is also varied depending on the relative positional relation between the spot and the guide groove besides its variation due to the variation of the polarizing direction.

That is, the beam which has formed a spot on the magneto-optic disk D is diffracted by the guide groove formed in the disk D. Therefore, a far field pattern of the reflecting beam is also varied depending on the positional relation thereof. Moreover, since the wedge-shaped prism 20 splits the reflecting beam into two portions so that a polarity can be obtained depending on the variation of the far field pattern, tracking errors can be detected by deducting the output of the light receiving areas where the beams have been radiated according to the push-pull method.

The deducted signal is mixed with the two signals of the reproducing signal and tracking error signal, as previously described. However, since the frequency of the reproducing signal is very high compared with that of the tracking error signal, these signals can be split by a filter.

Therefore, the high frequency varying composition can be detected as a reproducing signal and the low frequency varying composition as a tracking error detecting signal.

As described in the foregoing, according to the invention shown in this embodiment, focussing error signals, tracking error signals and, when reproducing, reproducing signals by one light receiving element can be detected. Accordingly, number of the component parts can be reduced and the optical system can be made compact. Moreover, adjustments thereof can be easily performed.

FIGS. 6 through 11 illustrate a second embodiment of the present invention.

As is shown in the figures, an optical system B according to the second embodiment includes a semiconductor laser beam emitting element 1, a collimate lens 2, a beam forming prism 3, a half mirror prism 4, an objective lens 5, a half-wave plate 6, a condenser lens 10, and a cylindrical lens 11, all of which are identical to those included in the optical system B of the first embodiment. Disposed between the half-wave plate 6 and the condenser lens 10 is a wedge-shaped prism 40 that functions as a polarizing beam splitting means. The wedge-shaped prism 40 is employed in order to bend the optical path as a whole of the reflecting beam coming from the magneto-optic disk D by approximately 90 degrees. Moreover, a light receiving element 50, as will be described below, is disposed in a position where the reflecting beam is converged by the above-mentioned various lenses.

Figure 7:
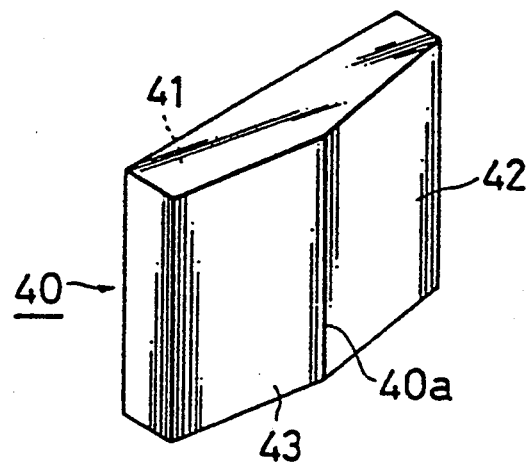
FIG. 7 is a perspective view of wedge-shaped prism of FIG. 6.

The wedge-shaped prism 40 includes a first reflecting surface 41 which forms about 45° with the optical axis of the beam outgoing from the half-wave plate 6, and a second and a third reflecting surfaces 42 and 43 each having a roof-shape tilted by a predetermined angle with respect to the first reflecting surface 41. The wedge-shaped prism 40 has a configuration as shown in FIG. 7.

The first reflecting surface 41 is coated with a polarizing beam splitting material for surface reflecting a composition (S composition) perpendicular to the incident plane or plane of incidence of the first reflecting surface 41 to a direction different from the incident direction and allowing a composition (P composition) parallel to the incident plane to pass therethrough. The term "incident plane" of the first reflecting surface 41 when used herein means a plane including the ray of light made entrance to the first reflecting surface 41 and the normal line of the first reflecting surface 41 at an incident point of this ray of light. The ray of light reflected by the first reflecting surface 41 and including the S composition becomes a beam of light for detecting focussing errors.

A ridge line 40a, which becomes an intersecting line of the first and the second reflecting surfaces 42 and 43, generally coincides with the diameter thereof in a direction corresponding to the track width direction of the beam passed through the first reflecting surface 41. Moreover, the second and third reflecting surfaces 42 and 43, and the ridge line 40a split the beam passed through the first reflecting surface 41 into two beams of light for detecting tracking errors to back reflect thereof so that a polarity of the tracking error can be obtained.

Figure 8:
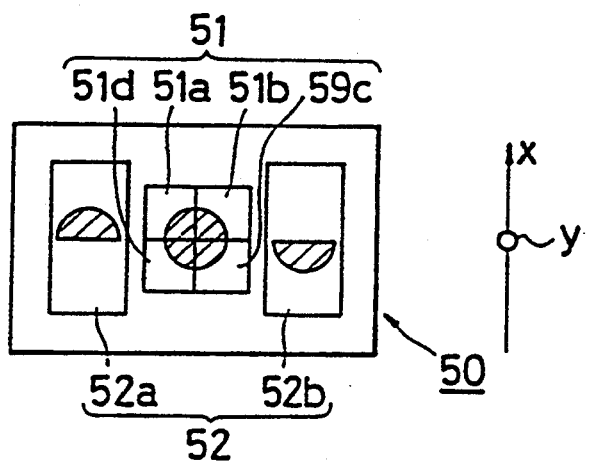
FIG. 8 is a plan view of a light receiving element used with the optical system shown in FIG. 6.

The light receiving element 50, shown in FIG. 8, includes a light receiving portion 51 for detecting focussing errors and a light receiving portion 52 for detecting tracking errors. The light receiving portion 51 for detecting focussing errors includes four light receiving areas 51a, 51b, 51c and 51d, the light receiving areas 51a, 51b, 51c and 51d being arranged in the form of a matrix or grill pattern, i.e., the light receiving areas 51a, 51b, 51c and 5d being arranged in two rows and two columns. The light receiving portion 52 for detecting tracking errors includes two light receiving areas 52a and 52b which are disposed to both sides in the figure with the light receiving portion 51 for detecting focussing errors sandwiched therebetween. The light receiving areas 52a and 52b are extended in parallel relation with each other and also in parallel relation with the arranging direction of the light receiving areas 51b, 51c and 51a, 51d. A light receiving element 50, such as, for example, a six split pin photo diode, may be used as a light pick-up for a compact disk or for a video disk.

The magneto-optic disk D employed here comprises a base plate formed with a magnetic film, and is provided with a spiral guide groove along a track for recording information. When information is not recorded, it is magnetized in one direction.

In such an optical system B as mentioned above, a linearly polarized beam emitted by the laser beam emitting element 1 of a semiconductor is collimated by the collimate lens 2, and corrected its configuration into a circular shape in section by the beam forming prism 3. The beam passed through the half mirror prism 4 is formed as a very tiny spot on the magneto-optic disk D by the objective lens 5 and is then reflected by the magneto-optic disk D. This reflecting beam is made incident to the half mirror prism 4, again through the objective lens 5.

Figure 9:
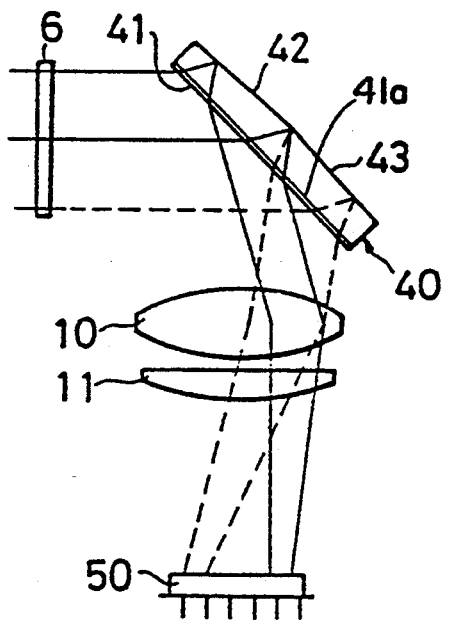
FIG. 9 is a schematic view showing a part of FIG. 6 together with the optical paths of back reflecting compositions by second and a third reflecting surfaces of the wedge-shaped prism.
Figure 10:
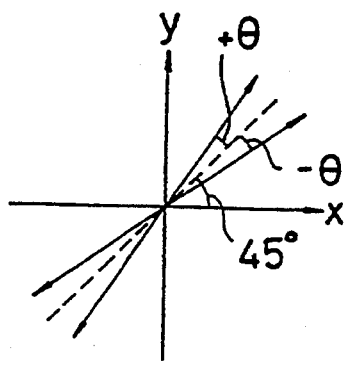
FIG. 10 is a view showing a turn of the polarizing direction of the reflecting beam of the magneto-optic disk shown in FIG. 6 due to a magnetic Kerr effect.

Furthermore, this reflecting beam is reflected toward the half-wave plate 6 by the half mirror prism 4 and passed through the half-wave plate 6. The S polarizing light composition out of the linearly polarized light compositions passed through the half-wave plate 6 is reflected by the first reflecting surface 41, as shown in FIG. 6, by the function of the polarizing beam material coated on the first reflecting surface 41 of the wedge-shaped prism 40 and becomes a beam of light for detecting focussing errors. The P polarizing beam composition passed through the half-wave plate 6 is passed through the first reflecting surface 41, and then reflected in different directions by the second and third reflecting surfaces 42 and 43, as shown in FIGS. 9, to become two beams of light for detecting tracking errors. The three split beams of light are all converged toward the light receiving element 50 through the condenser lens 10 and the cylindrical lens 11.

The objective lens 5 is actuated by an actuator (not shown) according to each error signal as will be described in order to correct forcussing errors and tracking errors due to surface swing or eccentricity of the magneto-optic disk D.

Next, the function of an information recording/reproducing apparatus for a magneto-optic disk provided with the optical system B will be described. For easy understanding, the description will be made on the function by dividing it in two categories, i.e, a first category wherein information is recorded and a second category wherein information is reproduced.

In order to record information on the magneto-optic disk D, the semiconductor laser beam emitting element 1 is oscillated according to an information signal, and the laser beam having a high output power is converged into a very tiny spot, in the manner previously described, and is then radiated to the magneto-optic disk D. At that time, the laser beam partly raises the temperature of the magneto-optic disk, weakening the anti-magnetic force of the magneto-optic disk D at its portion where the temperature has been partly raised. On the other hand, in that state, the magneto-optic disk D is incurred with a weak magnetic field by a magnet (not shown) from outside to reverse the magnetization of the temperature-raised portion.

In this way, the portion of the magneto-optic disk D where the laser beam has been radiated and the remaining portion thereof where the laser beam has not been radiated are made different in direction of magnetization, and information is recorded depending on the direction of magnetization.

On the other hand, when such recorded information is to be reproduced, a turn of polarizing direction due to the magnetic Kerr effect is utilized.

More specifically, in the optical system B, when the linearly polarized laser beam emitted by the semiconductor laser beam emitting element 1 is radiated in its form of a very tiny spot, as mentioned, to the magneto-optic disk D, the polarizing direction of the reflecting beam reflected by the magneto-optic disk D is turned by $+\theta$ or by $-\theta$, depending on the direction of magnetization in the position where the spot has been formed. Moreover, the reflecting beam which has been turned in its polarizing direction is reflected by the half mirror prism 4 and is then further turned by 45° by the half-wave plate 6.

For the purpose of explanation, the direction vertical to the paper surface of FIG. 6 is referred to as an "x-axis" and the direction vertical both to the x-axis and the optical axis of the beam reflected by the half mirror prism. 4 is referred to as a "y-axis". When an outgoing beam of the half-wave plate 6 is viewed from a position faced to the beam outgoing face of the half-wave plate 6, the polarizing direction of the reflecting beam reflected by the magneto-optic disk D becomes something like that shown in FIG. 10. That is, the polarizing direction of the reflecting beam coming from the magneto-optic disk D is varied as shown by N and S in FIG. 10, depending on the direction of magnetization of the track of the magneto-optic disk D at its portion where the spot has been formed. Shown by the broken line in the figure is a reference azimuth when the direction is not affected by the magnetic Kerr effect. The reference azimuth forms 45° with the x-axis.

The reflecting beam which has been turned in its polarizing direction, in the manner as described, is then arrived at the wedge-shaped prism 40. Only the x-axis composition of the arrived beam at the wedge-shaped prism 40 is allowed to pass and its y-axis direction composition is reflected due to the function of the aforementioned polarizing beam splitting material coated on the first reflecting surface 41. The x-axis direction composition of the beam passed through the first reflecting surface 41 is further back reflected by the second and third reflecting surfaces 42 and 43, and is then again passed through the first reflecting surface 41 to converge toward the light receiving element 50.

Therefore, if the intensity of the beam surface reflected by the first reflecting surface 41 and radiated to the light receiving portion 51 for detecting focussing errors is referred to as a "first intensity of the beam", and if the intensity of the beam back reflected by the second and the third reflecting surfaces 42 and 43 and radiated to the light receiving portion 52 for detecting tracking errors is referred to as a "second intensity of the beam", the ratio between the first intensity of the beam and the second intensity of the beam becomes a ratio between the S polarizing beam composition and the P polarizing beam composition with respect to the first reflecting surface 41. When the spot correctly traces the track, the ratio can be represented by the following formula.

$$\sin^2(45\pm\theta) : \cos^2(45\pm\theta)$$

Therefore, by finding a difference in the output between the two light receiving portions 51 and 52, a plus and/or a minus signal proportional to about $2\theta$ (i.e., a reproducing signal) can be obtained.

Next, there will be described the way of detecting focussing errors and tracking errors when information is recorded or when information is reproduced.

Figures 11A, 11B, 11C:
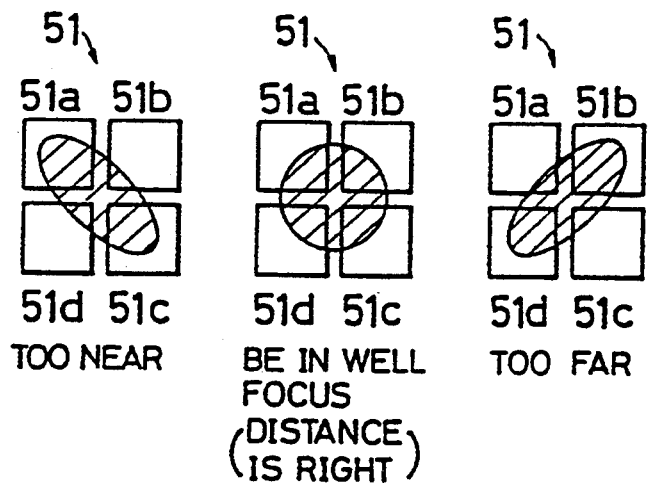
FIGS 11A-11C are schematic view showing a light receiving state of the light receiving portion for detecting focussing errors of the light receiving element shown in FIG. 8.
Figure 12:
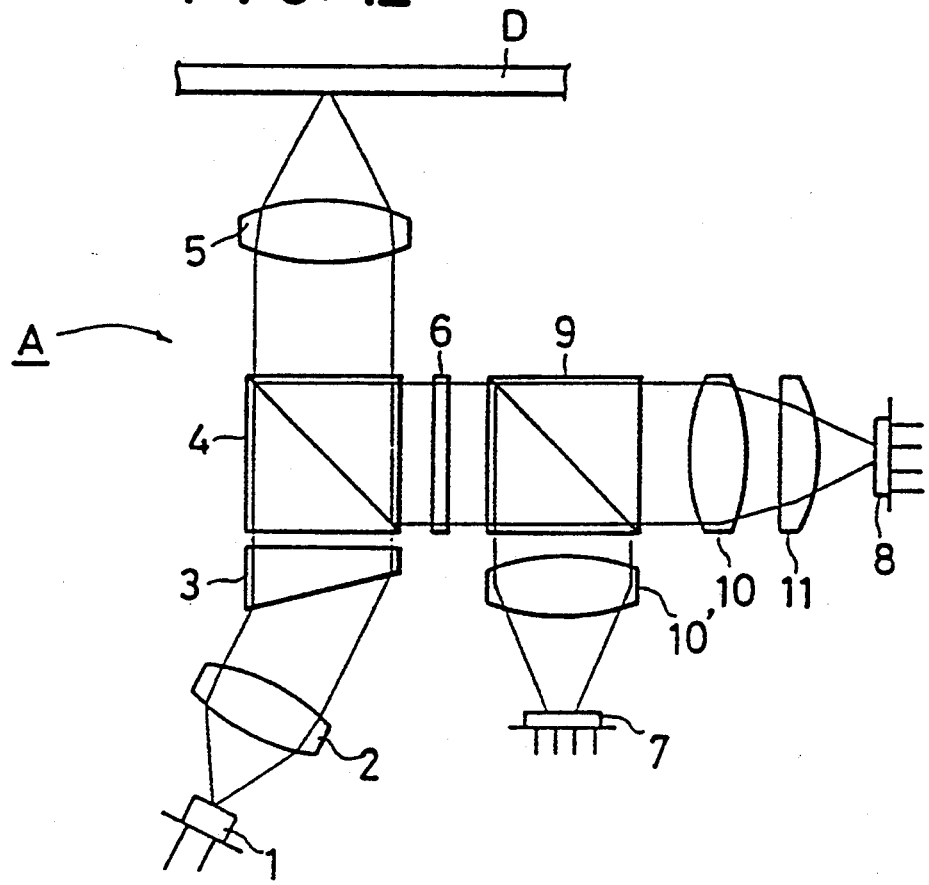
FIG. 12 is a schematic view showing a conventional optical system of an information recording/reproducing apparatus for a magneto-optic disk.

The outgoing beam from the half-wave plate 6 is converged to its portion which has been reflected by the first reflecting surface 41 of the wedge-shaped prism 40 toward the center of the light receiving element 50, as shown in FIG. 6, and is made incident to the light receiving portion 51 for detecting focussing errors disposed to the center of the light receiving element 50. The light receiving state of the light receiving portion 51 for detecting focussing errors (i.e., the beam radiating state to the light receiving portion 51 for detecting focussing errors) is varied, as shown in FIGS. 11(A), 11(B) and 11(C), depending on the distance between the objective lens 5 and the magneto-optic disk D. That is, when the distance is too near, the beam is chiefly radiated to the light receiving areas 51a and 51c located on one diagonal line, as shown in FIG. 11(A), whereas when the distance is too far, the beam is chiefly radiated to the light receiving areas 51b and 51d located on the other diagonal line as shown in FIG. 11(C). When the distance is right, the beam is equally radiated to these four light receiving areas, as shown in FIG. 11(B).

Therefore, by finding the difference between the sum of the output of the light receiving areas 51a and 51c and the sum of the output of the light receiving areas 51b and 51d, the focussing error signal can be detected according to the astigmatism method.

The detection of tracking error signals, as will be described hereinafter, is performed by deducting the output of the respective light receiving areas 52a and 52b of the light receiving portion 52 for detecting tracking errors.

The beams which have been reflected back by the second and third reflecting surfaces 42 and 43 are reflected in different directions and converge toward the respective light receiving areas 52a and 52b of the light receiving portion 52 for detecting tracking errors.

At that time, the intensity of the beams radiated to the respective light receiving areas 52a and 52b is varied depending on the relative positional relation between the spot and the guide groove.

That is, the beam which has formed a spot on the magneto-optic disk D is diffracted by the guide groove formed in the disk D. Therefore, a far field pattern of the reflecting beam is also varied depending on the positional relation thereof. Moreover, since the second and third reflecting surfaces 42 and 43 of the wedge-shaped prism 40 split the reflecting beam into two portions so that a polarity can be obtained depending on the variation of the far field pattern, tracking errors can be detected by deducting the output of the light receiving areas 52a and 52b where the beams have been radiated according to the push-pull method.

The tracking error signal can also be detected by deducting the sum of output of the light receiving areas 51a and 51d of the light receiving portion 51 for detecting focussing errors and the sum of the output of the light receiving areas 51c and 51d of the light receiving portion 51 for detecting focussing errors as described:

As described in the foregoing, according to the invention of the second embodiment, one light receiving element can be used to detect focussing error signals, tracking error signals and, when reproducing information, reproducing signals. Accordingly, the number of component parts can be reduced and therefore, the optical system can be made compact. Moreover, adjustments thereof can be easily performed.

Furthermore, if this optical system is utilized, there can be provided a pickup for a small and light magneto-optic disk suitable to high-speed access, etc.

What is claimed is:

1. A signal detecting optical system of an information recording/reproducing apparatus, said apparatus including a laser beam source for providing a laser light beam onto a magneto-optic disk utilized with the information recording/reproducing apparatus, focussing errors and tracking errors of a reflected laser beam from said disk being detected by said signal detecting optical system, said signal detecting optical system comprising:

an objective lens for converging the laser beam emitted by the laser beam source onto said magneto-optic disk and for transmitting a reflected laser beam from said disk;

polarizing means for splitting the laser beam reflected from said magneto-optic disk and then transmitted through said objective lens into three light beams, wherein one light beam is employed for detecting focussing errors and two light beams are employed for detecting tracking errors, said polarizing means comprising a coating material that functions to split a portion of said reflected beam in such a manner that any two of said three light beams become linearly polarized beams of light that are perpendicular to each other, said two linearly polarized light beams are employed for detecting tracking errors;

a light receiving element having a light portion for detecting focussing errors and a light receiving portion for detecting tracking errors, said light receiving portion for detecting focussing errors being provided with a plurality of light receiving areas for receiving said light beam for detecting focussing errors, said light receiving portion for detecting tracking errors being provided with a pair of light receiving areas for receiving said two light beams that are employed for detecting tracking errors, said pair of light receiving areas for detecting tracking errors being positioned to sandwich said light receiving portion for detecting focussing errors; and said polarizing means comprising a wedge shaped prism, said wedge shaped prism transmits therethrough approximately half of said beam reflected by said magneto-optic disk, said coating material of said polarizing means splitting the portion of said reflected beam transmitted by said wedge-shaped prism into said two light beams that are employed for detecting tracking errors so that said two light beams become linearly polarized beams of light that are perpendicular to each other.

2. The signal detecting optical system of an information recording/reproducing apparatus for a magneto-optic disk as claimed in claim 1, wherein said light receiving portion for detecting focussing errors has a pair of light receiving areas which are arranged adjacent to each other, said pair of light receiving areas of said light receiving portion for detecting tracking errors being disposed in a direction that is perpendicular to an arranged direction of said pair of light receiving areas of said light receiving portion for detecting focussing errors.

3. The signal detecting optical system of an information recording/reproducing apparatus for a magneto-optic disk as claimed in claim 2, wherein said pair of light receiving areas of said light receiving portion for detecting focussing errors extend parallel to each other, whereas said pair of light receiving areas of said light receiving portion for detecting tracking errors are perpendicular to an extending direction of said pair of light receiving areas of said light receiving portion for detecting focussing errors.

4. A signal detecting optical system for an information recording/reproducing apparatus including a laser beam source for emitting a laser beam, said information recording/reproducing apparatus utilizing a magneto-optic disk from which the laser beam emitted by the laser beam source is reflected, said signal detecting optical system comprising:

an objective lens for converging the laser beam that is emitted by the laser beam source onto said magneto-optic disk and transmitting a reflected laser beam from said disk;

a single piece polarizing means for splitting the laser beam, reflected from said magneto-optic disk and then transmitted through said objective lens, into a first polarized light beam that is employed to detect focussing errors and second and third polarized light beams that are employed to detect tracking errors, said polarizing means transmitting therethrough approximately half of said reflected beam for detecting tracking errors, said polarizing means being coated with a material that operates to split said reflected beam in such a manner that the second and third light beams are linearly polarized perpendicularly to each other;

means for detecting focussing errors and tracking errors of said reflected light beam comprising a light receiving element having a light receiving portion for detecting focussing errors and light receiving portion for detecting tracking error, said light receiving portion for detecting focussing errors being provided with a plurality of light receiving areas for receiving said light beam that is employed for detecting focussing errors, said light receiving portion for detecting tracking errors being provided with a pair of light receiving areas for receiving said second and third light beams that are employed for detecting tracking errors, said pair of light receiving areas for detecting tracking errors being positioned to sandwich said light receiving portion for detecting focussing errors, wherein said light receiving portion for detecting focussing errors includes a pair of light receiving areas that are arranged adjacent to each other, said pair of light receiving areas of said light receiving portion for detecting tracking errors being arranged in a direction that is perpendicular to the arranging direction of said light receiving portion for detecting focussing errors.

5. A signal detecting optical system for an information recording/reproducing apparatus for a magneto-optic disk as claimed in claim 4, wherein said pair of light receiving areas of said light receiving portion for detecting focussing errors extend in parallel with respect to each other, whereas said pair of light receiving areas of said light receiving portion for detecting tracking errors extended in a direction that is perpendicular to the extending direction of said pair of light receiving areas of said light receiving portion for detecting focussing errors.

6. A signal detecting optical system of an information recording/reproducing apparatus including a laser beam source for emitting a laser beam, said information recording/reproducing apparatus employing a magneto-optic disk from which the laser beam emitted from the laser beam source is reflected, said signal detecting optical system comprising:

an objective lens for converging the laser beam emitted by the laser beam source onto said magneto-optic disk and for collimating the beam reflected by said magneto-optic disk;

a wedge-shaped prism having an outgoing face and a pair of incident faces which are tilted with respect to said outgoing face and which are adjacent to each other, a ridge line serving as a border between said incident faces, said wedge shaped prism being located at a position for transmitting therethrough approximately half of said light beam reflected by said magneto-optic disk, said pair of incident faces, which are tilted with respect to said outgoing face, being coated with a polarizing beam splitting material so that said approximately half of said light beam transmitted through said wedge shaped prism becomes linearly polarized beams of light that are perpendicular to each other; and means for detecting focussing errors and tracking errors of said reflected light beam including a light receiving element having a light receiving portion for detecting focussing errors and a light receiving portion for detecting tracking errors, said light receiving portion for detecting focussing errors having a pair of light receiving areas for receiving said light beam for detecting focussing errors, said light receiving portion for detecting tracking errors having a pair of light receiving areas, said pair of light receiving areas for detecting focussing errors being arranged in a direction that is perpendicular to said pair of light receiving areas for detecting tracking errors, said light receiving areas for detecting tracking errors being positioned to sandwich said light receiving portion for detecting focussing errors so as to receive said light beams for detecting tracking errors.

7. A signal detecting magneto-optical system of an information recording/reproducing apparatus, said apparatus including a light source for producing a light beam onto a magneto-optic disk utilized with said information recording/reproducing apparatus and in which a magnetic signal can be recorded, said signal detecting magneto-optical system comprising:

an objective lens for converging a light beam from the light source onto said magneto-optic disk said light beam being reflected by said magneto-optic disk along an optical path;

a wedge shaped prism disposed in the optical path of the light beam reflected from said magneto-optic disk so that approximately half of said reflected light beam is incident onto and transmitted through said wedged shaped prism and approximately of half of said reflected light beam is not incident onto said wedged shaped prism, said wedge shaped prism splitting the portion of the reflected light beam that is incident onto and transmitted through said wedge shaped prism into two linearly polarized light beams which are perpendicular to each other, means for detecting a magnetic signal in said magneto-optic disk and a tracking error signal based upon said two linearly polarized light beams, and means for detecting a focus error signal based upon a portion of the reflected light beam that is not incident onto said wedge shaped prism said means for detecting including:

a condenser lens for condensing said two linearly polarized light beams split by said by wedge shaped prism; and a light receiving element for detecting said linearly polarized light beams condensed by said condenser lens.

8. The signal detecting optical system of claim 7, wherein said light receiving element comprises two focus error detecting areas that disposed in a center of said light receiving element, and two tracking error detecting areas which are disposed on opposite sides of said two focus error detecting areas on said light receiving element.

9. The signal detecting optical system of claim 8, wherein said focus error signal is detected by said focus error detecting areas, said tracking error signal is detected by said tracking error detecting areas, and said magnetic signal is detected by said tracking error detecting areas, and means for separating said tracking error signal and said magnetic signal based upon frequency ranges of said tracking error signal and said magnetic signal.

10. The signal detecting optical system of claim 9, further comprising means for performing a knife edge operation to obtain said focus error signal and means for performing a push pull operation to obtain said tracking error signal.

11. A signal detecting optical system of an optical disk apparatus, said optical disk apparatus including a light beam source for providing a light beam onto an optical disk utilized with the optical disk apparatus, focus error signals and tracking error signals of the light beam being detected, said signal detecting optical system comprising:

an objective lens for converging the light beam onto the optical disk;

a condenser lens for condensing the beam reflected from said optical disk;

a wedge shaped prism that is disposed in an optical path of a beam reflected from said optical disk so that approximately half of said reflected beam is incident to and is transmitted by said wedge shaped prism and approximately half of said reflected beam is not incident to said wedged shaped prism, said wedge shaped prism comprising means for splitting said reflected beam incident to said wedge shaped prism into two light beams, and means for separating the reflected light beam incident to said wedge shaped prism into two components to detect a tracking error signal, the reflected light beam not incident to said wedged shaped prism being used to detect a focus error signal; and a light receiving element for detecting a tracking error and focus error of said beam condensed by said condenser lens for providing the tracking error signal and the focus error signal.

12. The singal optical system of claim 11, wherein said light receiving element comprises two focus error detecting areas that are disposed in a center of said light receiving element and two tracking error detecting areas that are disposed on both sides of said light receiving element.

13. The optical signal delecting system of claim 12, wherein said focus error signal is detected by said focus error detecting areas and said tracking error signal is detected by said track error detecting areas.

14. The signal detecting optical system of claim 13, further comprising means for performing a knife edge operation to obtain said focus error signal and means for performing a push pull operation to obtain said tracking error signal.

15. The signal detecting optical system of claim 11, further comprising means for forming said two light beams, split by said wedge-shaped prism into two linearly polarized light beams for detecting a magnetic signal in said optical disk.

16. A signal detecting optical system of an information recording/reproducing apparatus for a magneto-optic disk, said optical system comprising:

means for splitting a light beam reflected from the magneto-optic disk into at least two light beams having a first linearly polarizing component and a second linearly polarizing component, said splitting means having a first polarizing surface to transmit said first linearly polarizing component and a second polarizing surface to transmit said second linearly polarizing component, said splitting means providing said first linearly polarizing component and said second linearly polarizing component to be polarized perpendicular to each other;

means for detecting said split light beams, said detecting means having at least two light receiving portions, and;

means for separating output signals of said at least two light receiving portions into a tracking error signal that has a low frequency and a magnetic signal that has a high frequency based upon positions of said split light beams on said light receiving portions.

* * * * *

UNITED STATES PATENT AND TRADEMARK OFFICE
CERTIFICATE OF CORRECTION

PATENT NO. : 5,406,532
DATED : April 11, 1995
INVENTOR(S) : Koichiro NISHIKAWA

It is certified that error appears in the above-indentified patent and that said Letters Patent is hereby corrected as shown below:

At column 15, line 21 (claim 7, line 16), change "approximately of" to ---approximately---.

At column 15, line 37 (claim 7, line 31), change "said by wedge" to ---said wedge---.

At column 15, line 44 (claim 8, line 3), change "that disposed" to ---that are disposed---.

At column 16, line 24 (claim 12, line 1), change "singal optical" to ---signal detecting optical---.

At column 16, line 28 (claim 12, line 5), change "both sides of said" to ---opposite sides of said two focus error detecting areas on said---.

Signed and Sealed this

Tenth Day of October, 1995

Attest:

BRUCE LEHMAN

*Attesting Officer*        *Commissioner of Patents and Trademarks*